United States Patent

[11] 3,616,334

| [72] | Inventors | Walter W. Aker<br>Schenectady;<br>Dale H. Brown, Scotia; Henry S. Spacil, Schenectady; Donald W. White, Burnt Hills, all of N.Y. |
|---|---|---|
| [21] | Appl. No. | 742,699 |
| [22] | Filed | July 5, 1968 |
| [45] | Patented | Oct. 26, 1971 |
| [73] | Assignee | General Electric Company |

[54] ELECTRICALLY AND CHEMICALLY COUPLED POWER GENERATOR AND HYDROGEN GENERATOR
7 Claims, 4 Drawing Figs.

[52] U.S. Cl. ................................................. 204/129, 23/199, 23/281, 23/289, 204/1, 290/2
[51] Int. Cl. ............................................... C01b 13/04
[50] Field of Search ........................................... 23/281, 282, 288, 289; 204/1, 129; 290/2

[56] References Cited
UNITED STATES PATENTS

| 3,400,054 | 9/1968 | Ruka et al. | 204/1.1 |
| 3,459,953 | 8/1969 | Hughes et al. | 204/129 |

Primary Examiner—T. Tung
Attorneys—Richard R. Brainard, Paul A. Frank, Charles T. Watts, Leo I. Ma Lossi, Frank L. Neuhauser, Oscar B. Waddell and Melvin M. Goldenberg ABSTRACT: A solid oxygen-ion electrolyte cell electrically and chemically coupled with a thermal power generator is described wherein the generation of hydrogen is coulometric with respect to current received by the solid oxygen-ion electrolyte cell from the power generator. Hydrocarbon fuel is consumed in the thermal power generator to produce steam and generate electrical power. Both of these products are supplied to the solid oxygen-ion electrolyte cell wherein dissociation of the steam for the generation of hydrogen gas is carried on. A particular application of this invention described is the conversion of coal to ammonia.

Inventors:
Walter W. Aker,
Dale H. Brown,
Henry S. Spacil,
Donald W. White,
by Leo J. Marconi
Their Attorney.

Inventors:
Walter W. Aker,
Dale H. Brown,
Henry S. Spacil,
Donald W. White,
by
Their Attorney.

ELECTRICALLY AND CHEMICALLY COUPLED POWER GENERATOR AND HYDROGEN GENERATOR

BACKGROUND OF THE INVENTION

Solid oxygen-ion electrolyte fuel cell structures for operation at elevated temperatures are broadly old. Such fuel cells employ in combination a solid oxygen-ion electrolyte layer having electrodes at opposite faces thereof, fuel and oxygen supplies in communication with the respective electrodes and electrical leads connected to the respective electrodes.

Such fuel cell structures have been used to generate low voltage direct current power and have also been used to detect the presence of oxygen. When operated in reverse (electrical power supplied to the electrodes) such constructions will function as oxygen pumps or oxygen concentrators. In the latter application an electrical coupling between the solid oxygen-ion electrolyte cell and a source of electrical power is required. However, no simultaneous chemical coupling or operative chemical interdependence between these structures appears to have been proposed.

SUMMARY OF THE INVENTION

It has been found that by employing solid oxygen-ion electrolyte cells operating at elevated temperatures, preferably over 800° C. for the generation of hydrogen by the dissociation of water vapor and by both chemically and electrically coupling such a hydrogen generation equipment to a thermal power plant, the very interdependence of the components in such a combination is particularly attractive economically and provides a flexible base system to which various chemical syntheses employing the hydrogen output of the base system may be effectively added.

Thus, fuel is burned in the boiler of a power generator and incoming feed water to the boiler is converted to steam. This steam is used to drive a turbogenerator in the conventional manner to produce power. This power from the generator is used to operate solid oxygen-ion electrolyte cell structures, which is not unusual, but what is unique is that these cell structures are used to dissociate the low-pressure steam output of the turbogenerator yielding hydrogen gas such that the generation of hydrogen therefrom is coulometric with respect to current received from the turbogenerator. Also gas from the anode elements of these cell structures is fed to the boiler both to enter into the combustion process and to utilize the sensible heat therein. Additional interdependence may be used to advantage, for example, by employing power from the turbine to liquefy air for the production of nitrogen, which is combined with the hydrogen output from the solid oxygen-ion electrolyte cell structures to synthesize ammonia.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

Figure 1:
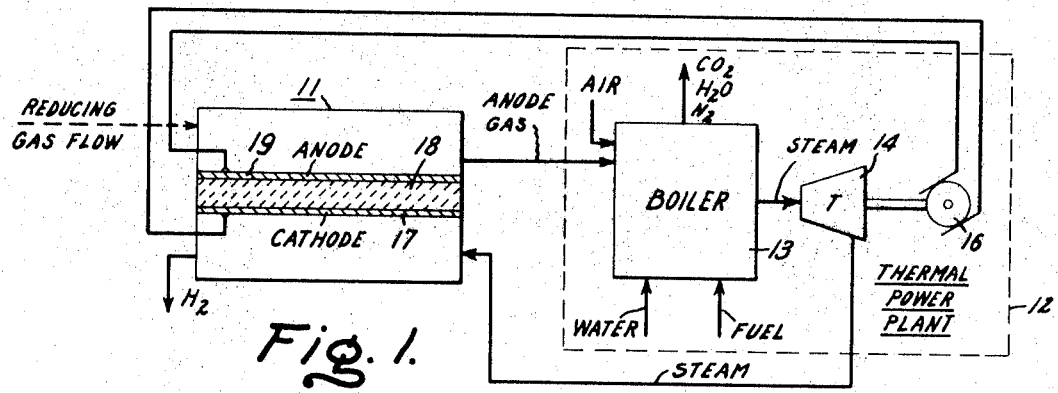
FIG. 1 is a schematic representation of the base system showing the chemical and electrical interdependence between the hydrogen generator and the thermal power generator.

The flow sheet of FIG. 1 schematically represents the combination of a hydrogen generator, solid oxygen-ion electrolyte cell 11, and thermal power plant 12 comprising boiler 13 and a turbogenerator (steam turbine 14 and direct current generator 16).

Hydrocarbon fuels, such as powdered coal or gas, are admitted to and burned in boiler 13 in the presence of air to convert incoming water to high-pressure steam. Depending upon the particular construction and method of operation of hydrogen generator 11, the gas from the anode element is conveyed to boiler 13 and will either be oxygen (which is added to air input to boiler 13) or a mixture of gases comprising CO, $H_2$, $N_2$, $CO_2$ and $H_2O$, which contributes residual combustible heating value to the boiler in addition to providing sensible heat.

The specific use of solid oxygen-ion electrolyte cell structures in combination with a coal gasifier for the hydrogenation of coal is described and claimed in U.S. Pat. application Ser. No. 742,824 Spacil filed July 5, 1968. Also, particular construction and operation of a solid oxygen-ion electrolyte cell for the generation of hydrogen is described and claimed in U.S. Pat. application Ser. No. 742,653 filed July 5, 1968. Both of the aforementioned applications are assigned to the assignee of the instant application and are incorporated by reference.

The generation of hydrogen in solid oxygen-ion electrolyte cell 11 involves the phenomenon of dissociation, rather than of electrolysis, because there are no ions present in solution as would be the case in electrolysis. Water is converted to high-pressure steam in boiler 13 for the operation of turbine 14. The low-pressure steam leaving turbine 14 is brought into contact with cathode 17 of cell 11, which is heated to some elevated operating temperature (preferably in excess of 800° C.). Cell heating is usually accomplished by the Joulean heating of the cell electrolyte 18 due to the passage of the dissociating current therethrough from anode 19 to cathode 17 plus some other form of heating, if required, such as electrical resistance heating or combustion of fuel.

Direct current power from generator 16 is applied to cell 11 as shown with the path of electrons flowing from generator 16 to cathode 17 and from anode 19 back to generator 16. At cathode 17, the low-pressure steam from turbine 14 is dissociated into hydrogen and oxygen and each atom of oxygen accepts two electrons to become an oxygen-ion Each oxygen-ion is then transported across solid oxygen-ion electrolyte layer 18 to anode 19. At anode 19, the oxygen-ions release electrons, which as has been noted above return to generator 16 making oxygen atoms available at anode 19.

If oxygen gas is a desired by product, there is no gas input into the anode region from the exterior of the cell and the structure may be employed as described above with the oxygen produced being used to enrich the boiler combustion air. Optionally, however, a reducing gas or mixture of reducing gases, for example a $CO/H_2$ mixture, may be caused to flow into contact with anode 19, whereby the oxygen produced at the anode becomes chemically combined with the reducing gas or gases as it evolves. A suitable reducing gas mixture may be produced, for example, by the partial oxidation of a hydrocarbon fuel in air in the presence of water vapor. By supplying reducing gas to the anodic electrode 19, the voltage of the solid oxygen-ion electrolyte cell 11 is reduced by an amount in the order from 0.6 to 1.2 volts. This behavior is known as "depolarization". In effect, the electrical power required from generator 16 for the dissociation of steam in cell 11 is reduced sharply and the heat produced by oxidation of the reducing gas components at the anode contributes to the operating temperature level. Any unoxidized reducing gas remaining in the outgoing anode gas flow will contribute to the fuel value in boiler 13 in addition to providing sensible heat to the boiler.

Figure 2:
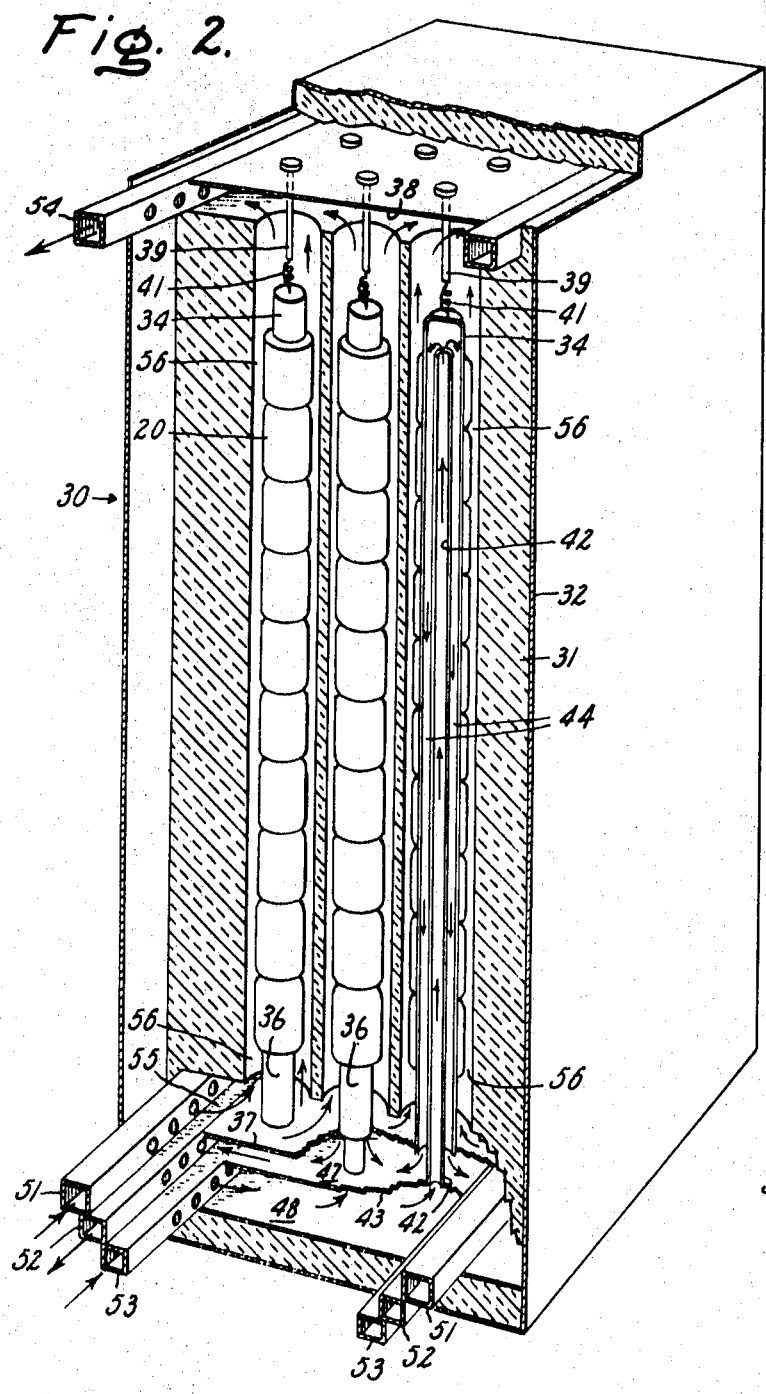
FIG. 2 is a perspective view, partially cut away, of an exemplary steam dissociation module housing a hexagonal array of multicell stacks of solid oxygen-ion electrolyte cells.
Figure 3:
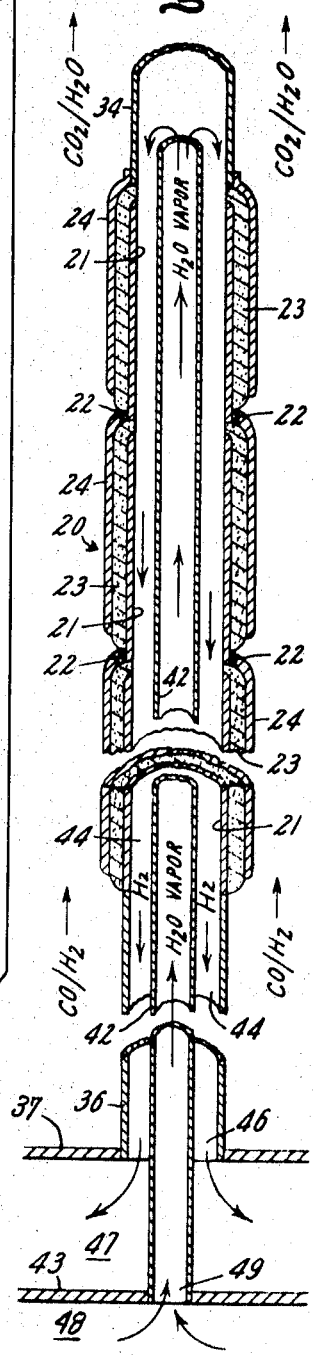
FIG. 3 is an enlarged view shown in cross section of one of the solid electrolyte cell stacks employed in FIG. 3.

The construction of an exemplary solid oxygen-ion electrolyte cell is described in detail in connection with FIGS. 2 and 3, however, in general, the construction of the cell stack shown in FIG. 3 is substantially in accordance with the disclosure in U.S. Pat. application Ser. No. 465,624—White, filed June 21, 1965, now U.S. Pat. No. 3,402,230. Various electrode and electrolyte constructions for use in such a cell stack are described in the following patent applications: Ser. No.

645,288—Mitoff, filed June 12, 1967; Ser. No. 680,245—Spacil, filed Nov. 2, 1967, now U.S. Pat. No. 3,503,809 and Ser. No. 645,423—Tedmon et al., filed June 12, 1967. All of the above-mentioned patent applications are assigned to the assignee of the instant invention and all are incorporated by reference herein.

Although the preferred oxygen-ion material for the practice of this invention is solid stabilized zirconia, other solid oxygen-ion materials, such as ceria-doped lanthanum oxide, which is an oxygen-ion electrolyte described in an article by Takahashi, Ito and Iwahara in Denki Kagaku, 34, 205–209 (1966) are satisfactory.

Zirconia may be purchased commercially either already stabilized or in a relatively pure state for stabilization (conversion from monoclinic zirconia to cubic zirconia) by the user. Typical analyses of the prestabilized and unstabilized zirconias used in the practice of this invention are set forth below:

| PRESTABILIZED | | UNSTABILIZED | |
|---|---|---|---|
| $ZrO_2$* | 93.94 | $ZrO_2$* | 99.08 |
| $SiO_2$ | 0.62 | $SiO_2$ | 0.18 |
| $Fe_2O_3$ | 0.10 | CaO | 0.22 |
| $TiO_2$ | 0.11 | MgO | 0.15 |
| CaO | 4.80 | $Fe_2O_3$ | 0.10 |
| MgO | 0.25 | $Al_2O_3$ | 0.16 |
| $Al_2O_3$ | 0.18 | $TiO_2$ | 0.11 |
| Total | 100.00 | Total | 100.00 |

*traces of $HfO_2$

Solid stabilized zirconia is a compound with a cubic crystal structure consisting of zirconia to which has been added calcium oxide, magnesium oxide, yttrium oxide, ytterbium oxide, or a mixture of rare earth oxides. For example, a preferred solid zirconia member employed as an electrolyte is stabilized with 11 molecular percent calcium oxide. Other stabilized zirconias, which may also be employed as solid electrolytes are discussed in "Oxide Ceramics" by Ryshkewitch, Academic Press, 1960, particularly on pages 354, 364 and 376 thereof.

A preferred design for a solid oxygen-ion electrolyte cell module is illustrated in FIG. 2 and a subassembly of solid electrolyte cells disposed in the stack arrangement shown in FIG. 2 is shown in enlarged view in FIG. 3. The preparation of the stack cell arrangement is largely described in the aforementioned application Ser. No. 465,624—White.

Stack 20 is made by (a) depositing a first electrode material (for example, porous nickel-zirconia cermet) in separate annular segments 21 with integral metal ring connector 22 (for example, nickel) along the length of the mandrel (not shown), (b) depositing thereover an annular coating 23 of solid oxygen-ion electrolyte (for example, yttria-stabilized zirconia sintered with iron oxide additive) covering the outer surface of each of the electrode segments 21 so that only one end of each segment 21 is completely covered (ring connector 22 remaining exposed), (c) depositing an outer layer of electrode material (for example, porous nickel-zirconia cermet) in the form of annular electrode segments 24 on the electrolyte layer 23 so that at one end each top layer segment 24 contacts the exposed ring connector 22 of the adjacent first electrode segment 21 and (d) removing the mandrel as, for example, by chemical etching.

The composite tube so created is then heat treated to obtain optimum densification of the stabilized zirconia electrolyte segment 23. A set of contiguous superimposed layers 21, 23, 24 constitute a single cell. In the form illustrated, the stack of cells is electrically and chemically connected in series as a self-supporting, gastight tubular structure. Module 30 houses a hexagonal array of stacks 20 positioned vertically in rows. Each stack 20 is enclosed in thermal insulation 31 spaced therefrom to permit the passage of gas as will be described hereinbelow and is maintained at operating temperature, preferably in excess of 800° C. The stacks 20 and the surrounding thermal insulation as, for example, aluminum silicate fibers are enclosed in metal housing 32. Other materials recited herein are, of course, also exemplary.

Nickel extension tube 34 at the upper end of each stack 20 is closed-ended at the top while the bottom end of the lower nickel extension tube 36 is welded to tube sheet 37 of nickel, which also serves as a bus bar. Nickel plate 38 near the top of module 30 serves as the second bus bar and is connected to each extension tube 34, each connection constituting a nickel rod 39 to which is affixed flexible nickel wire or braid 41. Therefore, although individual cells within a stack are electrically and chemically connected in series, the stacks 20 within module 30 are electrically connected in parallel. Each stack 20 has concentrically located therein a stainless steel tube 42 extending nearly the full length of stack 20 and, at its lower end, projecting beyond tube 36 to nickel tube sheet 43 to which it is welded. In this manner, annular space 44 between tube 42 and disconnected electrode segments 21 is in flow communication (via hole 46) with plenum 47 while the interior of tube 42 is in flow communication with plenum 48 (via hole 49).

The gas flow handling metal ducts 51, 52, 53, 54 are in flow communication with the interior of module 30 in the following manner: each of ducts 51 is in communication with plenum 55 through holes in the side of each duct; plenum 55 is in flow communication with the annular space 56 around each stack 20; ducts 52 via similar holes are in flow communication with plenum 47 (and thereby with the annular space 44 of each stack 20), and ducts 53 are in flow communication through holes in the side of these ducts with plenum 48 (and thereby with the interior of each tube 42).

In the preferred construction illustrated conduits 51 are provided in order to introduce a reducing gas or gas mixture to the anodic electrode (segments 24 of each stack 20). For example, by supplying a reducing gas such as a $CO/H_2$ mixture to the anode, the voltage of the individual dissociative cells would be reduced by an amount in the order of from 0.6—1.2 volts. This reduction (or depolarization) occurs, because the back electromotive force (EMF) of each dissociative cell would be reduced by this amount provided that sufficient reducing gas were supplied to the anode to combine with all of the oxygen evolved during dissociation of the steam. In this manner, the amount of electrical power required for the dissociation is substantially reduced. A significant benefit of this mode of operation is the fact that both anodic and cathodic electrodes can be made of relatively inexpensive, high conductivity materials such as nickel or cobalt, because the gas mixtures to which all of these electrode surfaces are exposed can be kept relatively reducing with respect to the metals of which the electrodes are made.

Although the preferred embodiment employs a tube configuration for the solid oxygen-ion electrolyte cells, because of the capability for advantageously connecting such cell configuration in series electrically, other configurations such as sheet configurations may be employed and offer the advantage of greater packing density in multicell assemblages.

In operation, an electrical potential is imposed between sheet 37 and sheet 38 from a DC power source (e.g. thermal power source 12), and water vapor (containing a small amount of hydrogen) is fed to space 44 via ducts 53, plenum 48 and tubes 42. The downwardly flowing water vapor, e.g. steam in annulus 44 is progressively deoxidized and emerges at the bottom as wet hydrogen gas entering plenum 47 and exiting from module 30 via ducts 52. The generation of hydrogen in this manner and using this construction is coulometric with respect to current received from the thermal power plant. The oxygen removed from the water vapor is transferred to the anode side of each fuel stack 20 through the electrolyte segments 23 by the mechanism of oxygen-ion transport. The anode feed gas (e.g. reducing mixture $CO/H_2$) flows upward through annular spaces 56 between the anode surfaces of stack 20 and the surrounding thermal insulation where it becomes progressively oxidized by the liberated oxygen gas so that the spent anode gas, which finally flows through passages in the thermal insulation into ducts 54 has been converted, in large part, to a mixture of $CO_2/H_2O$.

The amount of unreduced water vapor present in the hydrogen effluent from ducts 52 will depend upon the particular levels of current and steam flow rate employed. If a sufficiently high current and sufficiently low flow rate are employed, it is actually possible to produce a flow of hydrogen having a dew point as low as −70° F., although such operation is not recommended on a continuous basis. In a practical construction, it would appear to be more economical to dissociate somewhat less than all of the steam and to trap out the excess water by cooling and absorption, in those instances in which it is desired that the hydrogen be provided dry.

The EMF, which must be applied to each solid electrolyte cell, must be sufficient to cover the voltage needed for water dissociation plus the voltage required to effect oxygen-ion transfer (ohmic) and override the nonohmic voltage drops encountered in the cells. Stabilized zirconia electrolyte cells are preferred because of their relatively small nonohmic overvoltages.

If the oxygen or if both the hydrogen and oxygen produced in the electrolyte are of interest the reducing gas would not be introduced in order to allow oxygen gas to be concentrated at the anode. In such cases, ducts 51 would not be required. Under such conditions, however, the anode electrode material would have to be one very resistant to oxidation at high temperatures, e.g. porous praseodymium cobaltate.

In plant operation, the annular spaces 56 are kept hot by Joulean heating of the stacks themselves. The temperature within module 30 is controlled by controlling current and/or gas flow rates; for example, by balancing the Joulean heat production with sensible and conduction heat losses.

Several distinct advantages are offered in the cycle of the instant invention for the hydrogenation of coal: (1) the dissociation of water vapor may be accomplished with solid electrolyte cells utilizing a minimum of precious metals; (2) the vaporization step preceding the introduction of water into the solid electrolyte cell eliminates nonvaporizable impurities dissolved in the water and prevents cell contamination and (3) the necessity of employing a shift reactor to convert carbon monoxide to carbon dioxide to separate the carbon monoxide from the hydrogen product has been eliminated.

Figure 4:
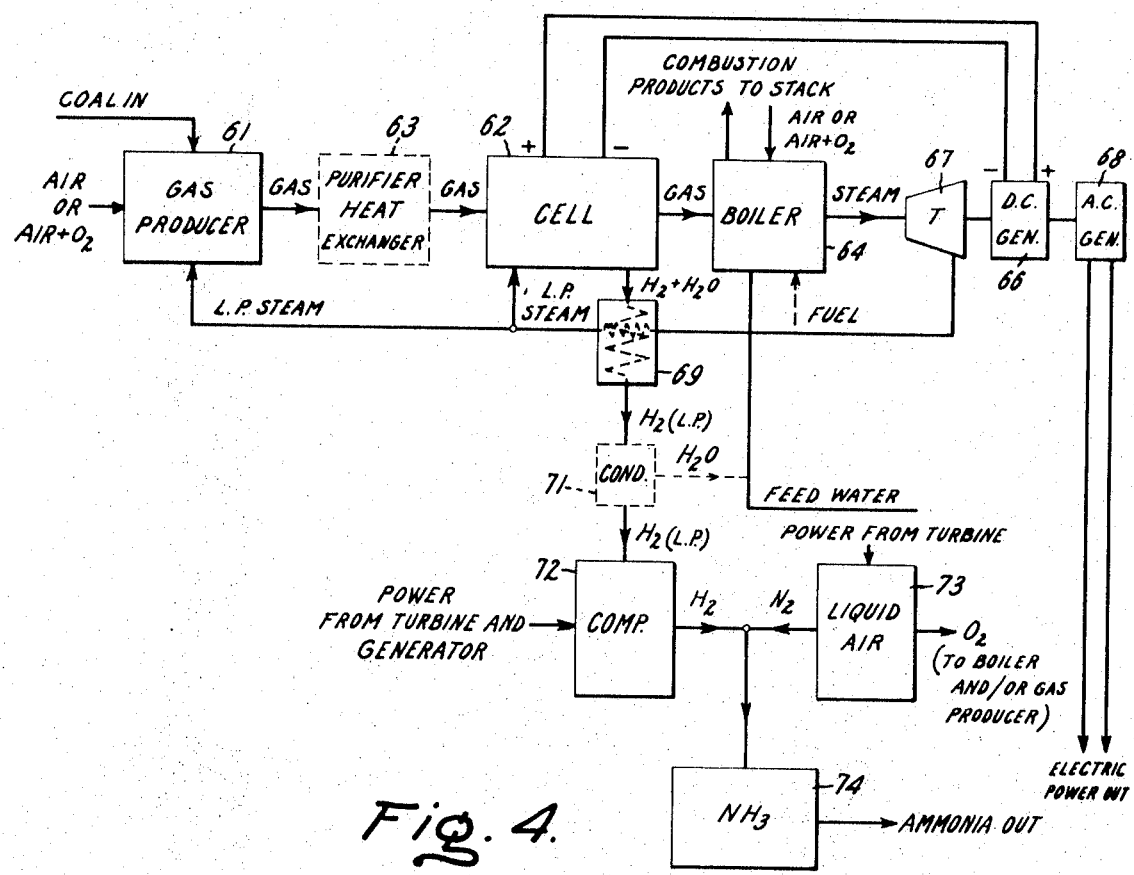
FIG. 4 is a flow diagram showing the use of a base system in an arrangement for the synthesis of ammonia.

The flow diagram in FIG. 4 for the conversion of coal to ammonia serves as a practical illustration of the application of the instant invention. Powdered coal is introduced into gas producer 61 together with air-or oxygen-enriched air and with low-pressure steam to form "producer gas" (a mixture principally of nitrogen, carbon monoxide and hydrogen) which serves as the anode feed gas for the solid oxygen-ion electrolyte hydrogen generator 62. As indicated hereinabove hydrogen generator 62 consists of a battery of solid oxygen-ion electrolyte cell stacks. If the sulphurizing potential of the raw producer gas is high enough to be detrimental to the anode structure of hydrogen generator 62 the gas may be cooled down in a heat exchanger, desulphurized and then reheated after purification. The combination of equipment required is indicated by numeral 63. If the sulphurizing potential of the gas is not objectionable, the raw producer gas is passed directly from producer 61 to the cell anodes in hydrogen producer 62.

Some of the carbon monoxide and hydrogen in the producer gas is oxidized to carbon dioxide and water in passage through the anode spaces of the cell stacks and the partially "spent" gas leaves the hydrogen generator 62 passing to boiler 64 of a conventional steam turbine plant where the sensible heat and the heat of combustion of the spent gas are used to generate power for operating hydrogen generator 62 and other plant equipment. Optionally, additional fuel such as coal may be supplied directly to the boiler as shown.

Preferably the direct current generator 66 driven by turbine 67 is of the acyclic type. Assuming enough power is realized from the operation of turbine 67, alternating current may be generated as a surplus power source with AC generator 68.

Effluent low-pressure steam from turbine 67 is conducted to the cathode structure of the cell stacks in hydrogen generator 62. Prior to admission the low-pressure steam is conducted through heat exchanger 69 to increase its temperature and to have a small percentage of hydrogen added thereto to protect the cathodes and leads of the cell stacks against oxidation. A portion of the effluent steam may also be conducted to gas producer 61.

The product hydrogen leaving generator 62 is cooled by passage thereof through heat exchanger 69 and, if necessary, further cooling thereof and removal of excess water may be accomplished in condenser 71. The hydrogen is then compressed to 3,000 p.s.i. in compressor 72, which could be operated by electrical power or directly from the shaft of turbine 67. Nitrogen is prepared cryogenically in unit 73 using power from generator 68 or turbine 67, and the proper proportion of nitrogen and hydrogen are admitted to ammonia synthesis apparatus 74. The oxygen byproduct from the liquid air plant 76 may be used effectively to increase the overall system efficiency, either being piped to the boiler to improve combustion efficiency or to the gas producer to raise its operating efficiency.

FOr depolarized operation wherein a reducing gas or gas mixture is supplied to the anode compartment or anode structure of hydrogen generator 62, the reducing gas is preferably generated by the partial combustion (with or without simultaneous reaction with $H_2O$) of coal, natural gas, oil or other hydrocarbons with air. This partial combustion may be conducted, for example in a gas producer (using coal) or in an endothermic gas generator (using natural gas). Gas produced in such units is inexpensive, but because of its high nitrogen content is inferior as a combustion fuel. The high nitrogen content is of no consequence to the performance of such gas when introduced to the anode structure for depolarization, however.

What we claim as new and desire to secure by Letters Patent of the United States is:

1. Apparatus for the production of hydrogen by the dissociation of water vapor comprising in combination:
   a. means for vaporizing water by the combustion of hydrocarbon fuel,
   b. means in flow communication with said vaporizing means for producing mechanical power from the flow of vaporized water therethrough,
   c. direct current power-generating means connected to be mechanically driven by said means for producing mechanical power, and
   d. a solid oxygen-ion electrolyte cell comprising a first electrode and a second electrode in contact with opposite faces of a layer of substantially nonporous solid oxygen-ion electrolyte material,
      1. said mechanical power-producing means being in flow communication with said first electrode,
      2. said means for vaporizing water being in flow communication with said second electrode and
      3. said power-generating means being electrically connected to both said electrodes to establish a path for the flow of electrons from said power generating means to said first electrode and from said second electrode back to said power generating means.

2. The apparatus for the production of hydrogen by the dissociation of water vapor substantially as recited in claim 1 wherein the solid oxygen-ion electrolyte material is stabilized zirconia.

3. The apparatus for the production of hydrogen by the dissociation of water vapor substantially as recited in claim 1 wherein the solid oxygen-ion electrolyte cell is one of a plurality of cells comprising a hollow-center cell stack.

4. Apparatus for the production of hydrogen by the dissociation of water vapor comprising in combination:
   a. means for vaporizing water by the combustion of hydrocarbon fuel,
   b. means in flow communication with said vaporizing means for producing mechanical power from the flow of vaporized water therethrough, c. direct current power generating means mechanically driven by said means for producing mechanical power,
d. a solid oxygen-ion electrolyte cell comprising a first electrode and a second electrode in contact with opposite faces of a layer of substantially nonporous solid oxygen-ion electrolyte material and
e. a source of reducing gas,
  1. said source of reducing gas and said means for vaporizing water each being in flow communication with said second electrode,
  2. said mechanical power producing means being in flow communication with said first electrode and
  3. said power-generating means being electrically connected to both said electrodes to establish a path for the flow of electrons from said power-generating means to said first electrode and from said second electrode back to said power-generating means.

5. The apparatus for the production of hydrogen by the dissociation of water vapor substantially as recited in claim 4 wherein the solid oxygen-ion electrolyte material is stabilized zirconia.

6. The apparatus for the production of hydrogen by the dissociation of water vapor substantially as recited in claim 4 wherein the solid oxygen-ion electrolyte cell is one of a plurality of cells comprising a hollow-center cell stack.

7. Apparatus for the production of ammonia from coal comprising in combination:
a. means for the conversion of coal to a reducing gas mixture containing carbon monoxide and hydrogen,
b. a solid oxygen-ion electrolyte cell comprising a first electrode and a second electrode in contact with opposite faces of a layer of substantially nonporous solid oxygen-ion electrolyte material,
  1. said coal conversion means being in flow communication with said second electrode,
c. means for vaporizing water by the combustion of hydrocarbon fuel,
d. means connected in flow communication with said vaporizing means for producing mechanical power from the flow of vaporized water therethrough,
e. direct current power-generating means connected to be mechanically driven by said means for producing mechanical power,
  1. said mechanical power-producing means being in flow communication with said first electrode,
  2. said means for vaporizing water being in flow communication with said second electrode and
  3. said power-generating means being electrically connected to both said electrodes to establish a path for the flow of electrons from said power-generating means to said first electrode and from said second electrode back to said power-generating means,
f. a compressor in flow communication with said first electrode to compress hydrogen received therefrom,
g. a source of nitrogen and
h. means for converting hydrogen-nitrogen mixtures to ammonia,
  1. said converting means being in flow communication with both said compressor and said source of nitrogen.

* * * * *